United States Patent [19]
Sperinck

[11] Patent Number: 5,125,226
[45] Date of Patent: Jun. 30, 1992

[54] COUPLING DUCTS OR THE LIKE

[75] Inventor: John Sperinck, Watford, England

[73] Assignee: Rolls-Royce plc, London, England

[21] Appl. No.: 557,024

[22] Filed: Jul. 25, 1990

[30] Foreign Application Priority Data

Aug. 3, 1989 [GB] United Kingdom ............... 8917824

[51] Int. Cl.⁵ .............................................. F02G 3/00
[52] U.S. Cl. ................................. 60/39.092; 403/300
[58] Field of Search ...................... 60/39.092; 285/330, 285/345, 350, 423; 403/300, 305, 361

[56] References Cited

U.S. PATENT DOCUMENTS

| | | | |
|---|---|---|---|
| 3,766,719 | 10/1973 | McAnally, III | 60/39.092 |
| 4,006,922 | 2/1977 | Bartholomew | 285/330 |
| 4,329,193 | 5/1982 | Sznopek et al. | 285/423 |

FOREIGN PATENT DOCUMENTS

| | | |
|---|---|---|
| 329938 | 6/1976 | Austria . |
| 0212851 | 3/1987 | European Pat. Off. . |
| 8800487 | 9/1989 | Netherlands . |
| 910104 | 11/1962 | United Kingdom . |
| 1387056 | 3/1975 | United Kingdom . |

*Primary Examiner*—Richard A. Bertsch
*Assistant Examiner*—Howard R. Richman
*Attorney, Agent, or Firm*—Oliff & Berridge

[57] ABSTRACT

A removable section of duct is sealingly coupled to a relatively fixed length of duct by means of a flexible, preferably elastic, sleeve which is attached to one of the lengths of duct towards one end thereof and at its other end to a relatively stiff collar which is shaped to fit closely over the adjacent end of the other duct. The elasticity of the sleeve tends to retain the collar in position and to maintain a tight seal while permitting a degree of relative movement including longitudinal thermal growth.

7 Claims, 3 Drawing Sheets

COUPLING DUCTS OR THE LIKE

The invention relates to coupling ducts or the like and has for one of its objects to provide means for releasably but sealingly coupling in end to end relationship adjacent lengths of air ducts in an aircraft installation where one of the lengths is needed to be removable.

According to the invention means for coupling ducts or the like in end to end relationship comprises a flexible sleeve attached at one end and towards one end of a first length of duct terminated at its opposite end by an outer collar, and the length of the sleeve is such that from a position in which the sleeve is rolled back on itself and laying over the duct, the collar may be pushed forward to extend the sleeve to overlap a further length of duct placed end to end with the first length of duct.

Preferably the flexible sleeve is formed of resilient or elastic material and the collar fits closely on the sleeve and duct.

Figure 1:
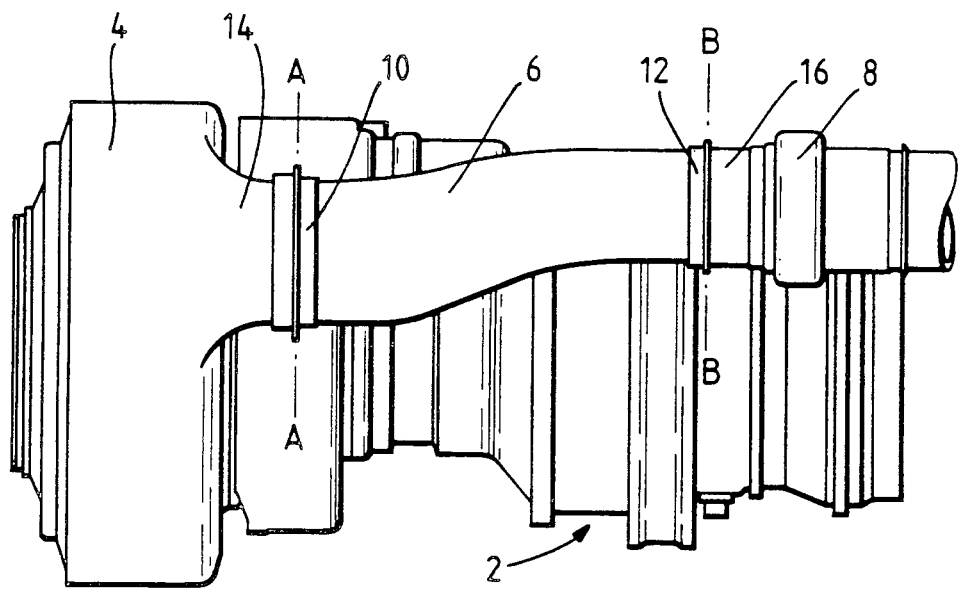
Figure 4:
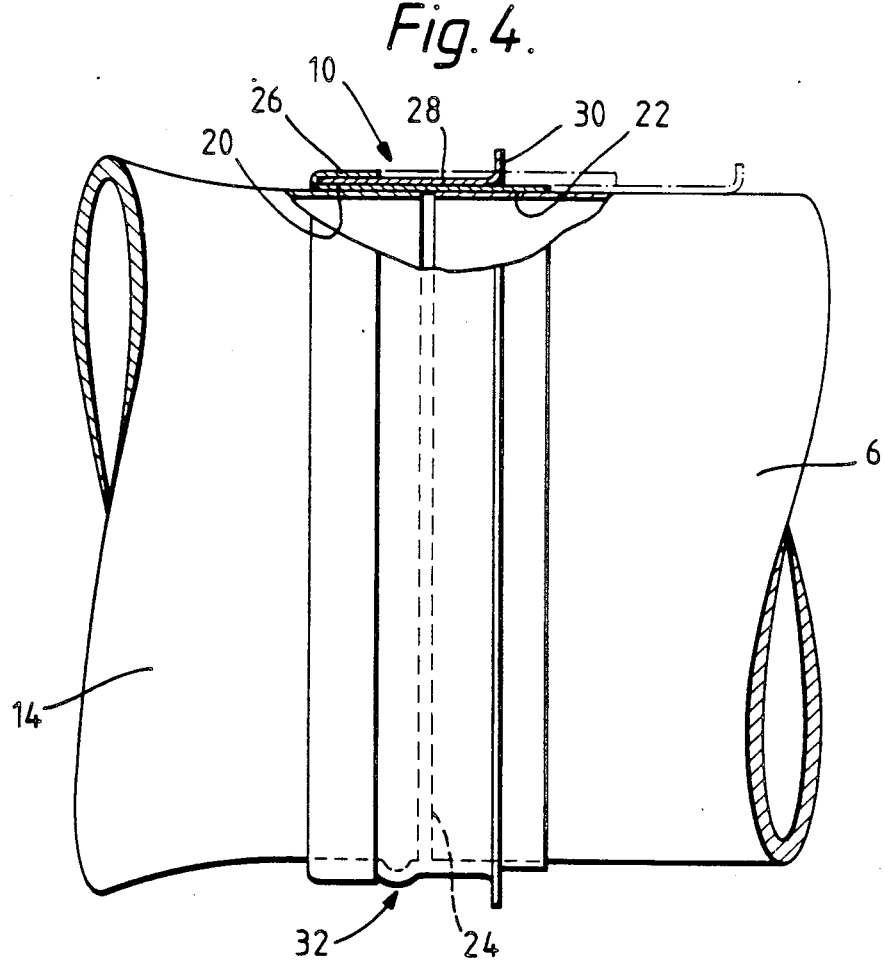
Figure 2:
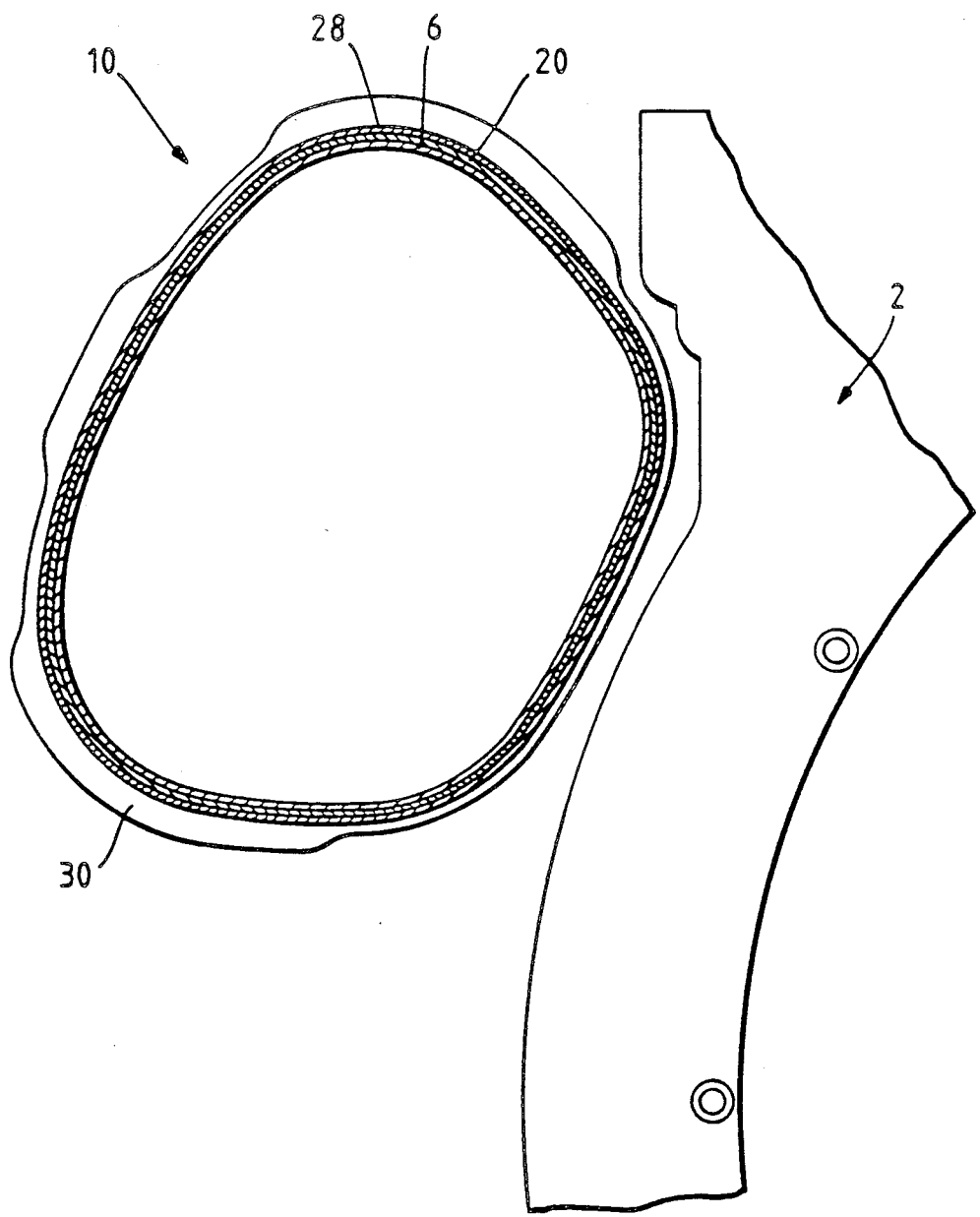
Figure 3:
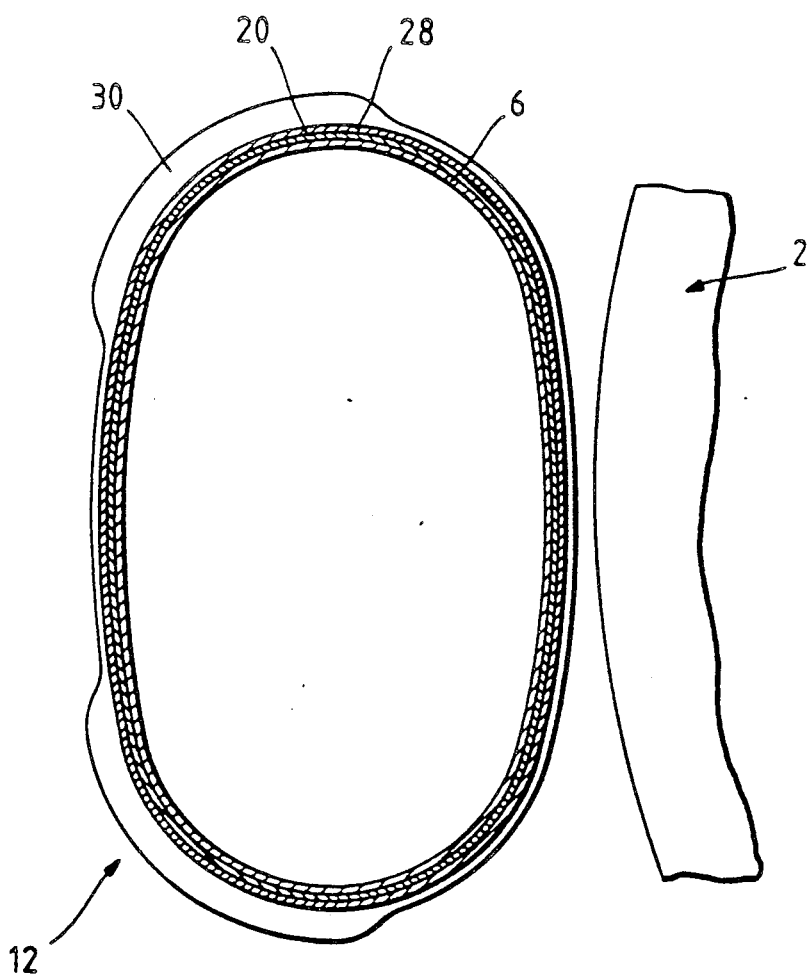

The invention will now be described further, by way of example only, with reference to the accompanying drawings, in which:

FIG. 1 shows a removable length of air duct running alongside a gas turbine engine and coupled at either end by coupling means of the invention, FIGS. 2 and 3 show cross-sections through the at line A—A and B—B, respectively, at opposite ends of the duct of FIG. 1, and FIG. 4 shows a partially sectioned view of one of the joints.

Referring firstly to FIG. 1, there is shown in outline only, generally indicated at 2, a helicopter gas turbine engine which is provided with an integral inlet particle separator 4 which protects the engine from erosion and foreign object damage by scavenging solid particles, and water droplets, from incoming air before its ingress to the engine. The scavenged debris is ducted via duct 6 to an ejector 8 where it is dumped into the engine exhaust. The duct 6 runs alongside the engine and is squeezed in between the outer casing of the engine 2 and the existing aircraft envelope (not shown). It has to carry a fairly large volume of air at low excess pressure over ambient so in order to comply with the constraints on available space, a large area non-circular duct the section of which changes along its length, see FIGS. 2 and 3, has been adopted.

In this particular embodiment environmental conditions are not extreme and for reasons of low cost and weight the duct 6 is constructed of laminated glass fibre reinforced materials. In normal running conditions the pressure drop between outside and inside the duct is of the order of 1 psi (0.00015 N M2). However the couplings at opposite end joints have to be tolerant of some longitudinal movement due to differential thermal expansion rates between the engine outer casing and the duct. Also, the duct 6 has to be removed periodically for routine maintenance of engine ancillary equipment over which it passes.

At either end of the lengths of duct 6 there are provided coupling means 10 and 12 by which the duct is joined respectively to the outlet 14 of inlet particle separator 4 and the inlet 16 of ejector 8. The coupling means 10, 12 straddle the joints effectively forming a sealing band between adjacent ducts while providing the flexibility required.

FIG. 4 shows in greater detail the components of the coupling means 10, although the second coupling 12 at the opposite end of the duct it will be understood is essentially identical.

The illustrated coupling means 10 comprises a length of flexible sleeve 20 composed of silicon rubber material which is attached at its rearward end 22, by a suitably glued joint or by bonding, to the length of duct 6 towards its forward end 24. The length of the sleeve 20 is sufficiently long that it extends well beyond the end 24 of the duct 6. The free or distal end 26 of the sleeve 20 is rolled back on itself and is attached to the forward end of a relatively stiff collar 28.

The collar 28 preferably made of glass fibre reinforced plastics material which may be formed integrally with the free end 26 of the sleeve, alternatively the collar may be made of a light metal such as aluminium and bonded to the sleeve.

As shown by the solid lines in FIG. 4, to couple together the two lengths of duct 6 and 14, the first length 6 is positioned end to end, and preferably abutting the particle separator outlet duct 14. The collar 28 is then moved forwards to overlap the end of the duct 14 and to extend the sleeve 20. The sleeve is sufficiently long that it overlaps the ducts 6 and 14 by similar amounts.

As will be apparent from FIG. 2 the shape of the collar 28 conforms closely with the shape of the ducts 6 and 14 in the region of the coupling. The internal dimensions of the collar closely match those of the duct 14 plus the sleeve thickness thus there is a degree of frictional engagement between the collar and the sleeve. In addition, the elastic properties of the material of sleeve 20 ensure that the portion of the sleeve which is rolled back over and attached to the outside of collar 28 exerts an axial pull on sleeve 20 tending to unroll, and therefore to further extend, the sleeve. The elasticity of the sleeve also assists in gripping the outer surface of the duct 14 producing a seal sufficient to withstand at least the modest differential pressure to which it is subjected in use. The unattached margin 30 of collar 28 is upturned to provide a lip by which it may be more easily manipulated. The inherent resilience provided by the coupling means enables the coupling to accomodate lateral movements of the duct without damage to either the coupling or the duct, and also without detachment.

If required positive engagement means may be provided to retain the collar and sleeve 20, 28 in the extended, sealing position. For example, as shown at 32 the exterior of duct 14 and a corresponding mating portion formed in the collar 28 which mutually engage when the sleeve is extended. Said interengaging formations comprising a raised feature on the outer periphery of the second length of ducting towards the coupled end thereof and a complementary depression on the inner surface of the sleeving collar.

The opposite end of the removable duct 6 may be provided with a similar extending sleeve arrangement at 12. Alternatively, the ejector inlet 16 and the duct end may be adapted to fit one within the other with suitable sealing means to provide the desired airtightness. With such an arrangement the effects of differential thermal expansion are compensated by the flexible sleeve joint at the other end of the duct.

As previously mentioned the cross-section of the ducts or lengths of duct, including the inlet and outlet ducts are non-circular as will be appreciated from even the briefest study of FIGS. 2 and 3. This presents no problem with the invention, quite simply the collar is formed with a shape conforming to the shape of the duct over which it is to fit. Obviously the collar must also be capable of passing over the other section of duct also but otherwise the sections of duct need not possess the same or a constant cross-section.

I claim:

1. A coupling means for use in a gas turbine engine for releasably coupling ducts in end to end relationship, wherein a first duct having a first end and a second duct having a second end are to be coupled with said ends abutting, the coupling mechanism comprising:

a flexible sleeve having a first end attached to the first duct behind the first end of the first duct and the flexible sleeve having a second end spaced from the first end by a distance sufficient for the flexible sleeve to overlap the abutting second end of the second duct, and a stiff collar surrounding the second end of the sleeve, said second end of the flexible sleeve being turned back on itself and attached to the stiff collar, the length of the flexible sleeve being such that the stiff collar overlaps the abutting ends of the first and second ducts whereby to enable the coupling to accommodate lateral movements of the ducts without damage to either the coupling or the ducts, but the sleeve is slidable over the first duct to withdraw the sleeve from the second duct thereby uncoupling the first and second ducts.

2. The coupling means as claimed in claim 1 wherein the flexible sleeve is formed of elastic material.

3. The coupling means as claimed in claim 1 wherein the collar conforms to the cross-section of the second duct.

4. The coupling means as claimed in claim 1 wherein the collar is formed of glass fiber reinforced plastics material.

5. The coupling means as claimed in claim 1 wherein the collar has a first end attached to the flexible sleeve and a second end opposite the first end provided with an upturned margin.

6. The coupling means as claimed in claim 1 further comprising means for positively retaining the collar in engagement with the second duct in the coupling position comprising interengaging features on said collar and said second duct.

7. A helicopter gas turbine engine installation including an inlet particle separator having a first length of outlet duct for scavenged debris which is coupled to a second length of an abutted duct in an end to end relationship by a coupling mechanism comprising a length of flexible sleeve having one end thereof attached to the abutted duct at one end thereof, the flexible sleeve further having a second end opposite said first end terminated by an outer circumferential collar, the length of the sleeve being such that the collar can be moved in one direction so the sleeve is rolled back on itself to overlay the abutted duct, and such that when the collar is moved in the opposite direction the sleeve extends to overlap the outlet duct and the stiff collar overlaps the abutting duct ends whereby to enable the coupling to accommodate lateral movements of the ducts without damage to either the coupling or the ducts.

* * * * *